(12) United States Patent
Wu et al.

(10) Patent No.: US 12,315,900 B1
(45) Date of Patent: May 27, 2025

(54) WASTE LITHIUM ION BATTERY ELECTROLYTE SOLUTION RECYCLING METHOD AND APPARATUS

(71) Applicant: Guangzhou Tinci Materials Technology Co., Ltd, Guangdong (CN)

(72) Inventors: Yupeng Wu, Guangdong (CN); Wentian Wei, Guangdong (CN); Yating Liu, Guangdong (CN); Chuanlin Chen, Guangdong (CN); Haiqiang Lin, Guangdong (CN); Heng Han, Guangdong (CN)

(73) Assignee: GUANGZHOU TINCI MATERIALS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/866,982

(22) PCT Filed: May 19, 2023

(86) PCT No.: PCT/CN2023/095377
§ 371 (c)(1),
(2) Date: Nov. 18, 2024

(87) PCT Pub. No.: WO2023/222127
PCT Pub. Date: Nov. 23, 2023

(30) Foreign Application Priority Data

May 20, 2022 (CN) .......................... 202210547202.2

(51) Int. Cl.
*H01M 10/00* (2006.01)
*C01D 15/08* (2006.01)
(Continued)

(52) U.S. Cl.
CPC ............ *H01M 10/54* (2013.01); *C01D 15/08* (2013.01); *C22B 7/005* (2013.01); *C22B 7/006* (2013.01)

(58) Field of Classification Search
CPC ............ H01M 10/54; H01M 10/0568; H01M 10/0525; H01M 10/0569;
(Continued)

(56) References Cited

U.S. PATENT DOCUMENTS

2017/0207503 A1* 7/2017 Billy ..................... H01M 10/54

FOREIGN PATENT DOCUMENTS

| CN | 102840707 A | 12/2012 |
|----|-------------|---------|
| CN | 104852102 A | 8/2015  |

(Continued)

*Primary Examiner* — Anca Eoff
*Assistant Examiner* — Monique M Wills
(74) *Attorney, Agent, or Firm* — Umberg Zipser LLP (57) ABSTRACT

The present application provides a waste lithium ion battery electrolyte solution recycling method including the steps of: crushing a waste lithium ion battery; cleaning with an organic solvent; performing first filtering; performing vacuum distillation; performing first thermal decomposition; dissolving by adding an acid solution; adding soluble carbonate and/or carbon dioxide for reaction; and performing second filtering. Thus, the solvent in the electrolyte solution can be obtained from the waste lithium ion battery, and the electrolyte is recycled in the form of phosphorus pentafluoride and lithium carbonate. The present application further provides a waste lithium ion battery electrolyte solution recycling apparatus, an electronic device and a computer readable storage medium.

16 Claims, 4 Drawing Sheets

(51) Int. Cl.
*C22B 7/00* (2006.01)
*H01M 10/54* (2006.01)

(58) Field of Classification Search
CPC ... H01M 2300/0025; H01M 2300/004; H01M 2300/0037; Y02E 60/10
See application file for complete search history.

(56) References Cited

FOREIGN PATENT DOCUMENTS

| | | |
|---|---|---|
| CN | 204577540 U | 8/2015 |
| CN | 106684487 A | 5/2017 |
| CN | 110203949 A | 9/2019 |
| CN | 113314776 A | 8/2021 |
| CN | 113322380 A | 8/2021 |
| CN | 114914570 A | 8/2022 |
| JP | 2016149330 A | 8/2016 |
| JP | 2019173106 A | 10/2019 |
| JP | 6651115 B1 | 2/2020 |
| WO | 2016012941 A1 | 1/2016 |

\* cited by examiner

WASTE LITHIUM ION BATTERY ELECTROLYTE SOLUTION RECYCLING METHOD AND APPARATUS

The present application claims the priority of the Chinese Patent Application No. 202210547202.2, with the title of "WASTE LITHIUM ION BATTERY ELECTROLYTE SOLUTION RECYCLING METHOD AND APPARATUS", filed on May 20, 2022 before the China National Intellectual Property Administration, which is incorporated herein by reference in its entirety.

TECHNICAL FIELD

The present application relates to the field of lithium ion batteries, and in particular, to a waste lithium ion battery electrolyte solution recycling method, a waste lithium ion battery electrolyte solution recycling apparatus, an electronic device and a computer readable storage medium.

BACKGROUND

Waste lithium ion batteries mainly contain outer packaging, electrolyte solution, positive electrode plate, negative electrode plate and plastic film. At present, there are quite a few methods for recycling the outer packaging, positive electrode plate, negative electrode plate and plastic film in batteries, and generally the recycling is achieved by the successive steps of crushing, sorting, pyrolysis, re-sorting, impurity removal, precipitation, and replacement. However, for the components in the electrolyte solution, it is usually treated by thermal decomposition or thermal volatilization, and then directly burned as tail gas, followed by dust removal and adsorption steps before discharge. These methods will lead to an increase in the amount of tail gas treatment, increase the difficulty and cost of treatment, and waste high-value components. Meanwhile, if not treated properly, it will also cause environmental pollution.

SUMMARY

In order to solve the problem that the waste lithium ion battery electrolyte solution cannot be completely recycled, resulting in a reduction of recycling efficiency, excessive costs of the tail gas treatment and an increased possibility of environmental pollution, the present application provides a waste lithium ion battery electrolyte solution recycling method and apparatus, an electronic device and a computer readable storage medium.

In a first aspect, the present application provides a waste lithium ion battery electrolyte solution recycling method, which comprises the following steps:
a step S11 of crushing a waste lithium ion battery to obtain a crushed battery; wherein the crushed battery comprises an electrolyte solution of the waste lithium ion battery;
a step S12 of cleaning the crushed battery with an organic solvent to obtain a first mixture; a step S13 of performing first filtering on the first mixture to obtain a first solid and a first solution, wherein the first solution comprises the electrolyte solution of the waste lithium ion battery;
a step S14 of vacuum distilling the first solution to obtain a first tail gas and a second solid, wherein the first tail gas comprises a gaseous solvent of the electrolyte solution of the waste lithium ion battery, and the second solid comprises an electrolyte of the electrolyte solution of the waste lithium ion battery;
a step S15 of performing first heating decomposition on the second solid to obtain a second tail gas and a third solid, wherein the third solid comprises lithium fluoride, and the second tail gas comprises phosphorus pentafluoride;
a step S16 of dissolving the third solid by adding an acid solution to obtain a second solution, wherein the second solution comprises lithium ions;
a step S17 of adding soluble carbonate, or carbon dioxide, or soluble carbonate and carbon dioxide into the second solution for reaction to obtain a second mixture; and
a step S18 of performing second filtering on the second mixture to obtain a fourth solid and a third solution, wherein the fourth solid comprises lithium carbonate.

In some embodiments, before the step S12, the waste lithium ion battery electrolyte solution recycling method further comprises a step S11 of crushing a waste lithium ion battery to obtain the crushed battery, wherein the crushed battery comprises the electrolyte solution of the waste lithium ion battery.

In some embodiments, in the step S14, the separation treatment is selected from vacuum distillation, atmospheric distillation and fractional distillation.

In some embodiments, after the step S13, the waste lithium ion battery electrolyte solution recycling method further comprises a step S131 of detecting a content of electrolyte in the first solution in the step S13; when the content of electrolyte is less than 1 mol/L, the first solution is used as the organic solvent in the step S12 to clean the crushed battery; when the content of electrolyte is equal to or greater than 1 mol/L, the step S14 is executed.

In some embodiments, after the step S14, the waste lithium ion battery electrolyte solution recycling method further comprises a step S141 of condensing and recycling the first tail gas in the step S14 at −20° C. to 30° C. to obtain an organic component solution.

In some embodiments, after the step S13, the waste lithium ion battery electrolyte solution recycling method further comprises the following steps:
a step S132 of heating to volatilize the first solid in the step S13 to obtain a sixth solid and a third tail gas;
a step S133 of condensing the third tail gas to obtain the organic component solution;
a step S134 of performing first sorting on the sixth solid to obtain a shell, a plastic film, a pile head and a seventh solid;
a step S135 of performing second heating decomposition on the seventh solid to obtain an eighth solid and a fourth tail gas;
a step S136 of introducing the fourth tail gas into an absorption liquid for absorption to obtain hexafluorophosphate, wherein the absorption liquid is a fluoride salt solution or a fluoride salt two-phase dispersion, and the fluoride salt is lithium fluoride, sodium fluoride, potassium fluoride, calcium fluoride or magnesium fluoride;
a step S137 of performing third heating decomposition on the eighth solid to obtain a ninth solid and a fifth tail gas;
a step S138 of performing second harmless treatment on the fifth tail gas; and
a step S139 of performing second sorting on the ninth solid to obtain copper, aluminum and black powder.

In some embodiments, after the step S15, the waste lithium ion battery electrolyte solution recycling method further comprises a step S151 of introducing the second tail gas in the step S15 into an absorption liquid for absorption to obtain hexafluorophosphate, wherein the absorption liquid is a fluoride salt solution or a fluoride salt two-phase dispersion, and the fluoride salt is lithium fluoride, sodium fluoride, potassium fluoride, calcium fluoride or magnesium fluoride.

In some embodiments, after the step S16, the waste lithium ion battery electrolyte solution recycling method further comprises a step S161 of performing third filtering on a dissolved substance of the third solid added with acid solution in the step S16 to obtain a second solution, wherein the second solution comprises lithium ions.

In some embodiments, after the step S18, the waste lithium ion battery electrolyte solution recycling method further comprises the following steps:
- a step S181 of adding calcium hydroxide into the third solution in the step S18 for reaction to obtain a third mixture;
- a step S182 of performing fourth filtering on the third mixture to obtain a fifth solid and a fourth solution, wherein the fifth solid comprises calcium fluoride; and
- a step S183 of performing first harmless treatment on the fourth solution.

In some embodiments, the organic solvent in the step S12 is selected from the group consisting of vinyl carbonate, propylene carbonate, dimethyl carbonate, methyl ethyl carbonate, diethyl carbonate, acetonitrile and a combination thereof.

In some embodiments, the acid solution in the step S16 is selected from the group consisting of sulfuric acid, hydrochloric acid, nitric acid, hydrofluoric acid, hydrobromic acid, perchloric acid and a combination thereof.

In some embodiments, the soluble carbonate in the step S17 is selected from the group consisting of sodium carbonate, potassium carbonate, ammonium carbonate and a combination thereof.

In some embodiments, the steps S11, S12, S13, S14 and S15 are all carried out in a protective atmosphere by an inert gas, wherein the inert gas is selected from the group consisting of nitrogen, helium, argon, carbon dioxide and a combination thereof.

In a second aspect, the present application provides a waste lithium ion battery electrolyte solution recycling apparatus, comprising:
- a crushing device, used for crushing the waste lithium ion battery to obtain a crushed battery; wherein the crushed battery comprises the electrolyte solution of the waste lithium ion battery;
- a cleaning device, used for cleaning the crushed battery with an organic solvent to obtain a first mixture;
- a first filtering device, used for filtering the first mixture to obtain a first solid and a first solution, wherein the first solution comprises the electrolyte solution of the waste lithium ion battery;
- a vacuum distillation device, used for performing vacuum distillation on the first solution to obtain a first tail gas and a second solid, wherein the first tail gas comprises a gaseous solvent of the electrolyte solution of the waste lithium ion battery, and the second solid comprises an electrolyte of the electrolyte solution of the waste lithium ion battery;
- a first heating decomposition device, used for performing first heating decomposition on the second solid to obtain a second tail gas and a third solid, wherein the third solid comprises lithium fluoride and the second tail gas comprises phosphorus pentafluoride;
- a dissolving device, used for dissolving the third solid by adding an acid solution to obtain a second solution, wherein the second solution comprises lithium ions;
- a reaction device, used for adding soluble carbonate, or carbon dioxide, or soluble carbonate and carbon dioxide into the second solution for reaction to obtain a second mixture; and
- a second filtering device, used for filtering the second mixture to obtain a fourth solid and a third solution, wherein the fourth solid comprises lithium carbonate.

In a third aspect, the present application provides an electronic device, comprising: a memorizer, used for storing an instruction; and a processor, used for calling the instruction stored in the memorizer to execute the waste lithium ion battery electrolyte solution recycling method according to any one of the first aspect.

In a fourth aspect, the present application provides a computer readable storage medium, wherein the computer readable storage medium stores an instruction, and when the instruction is executed by a processor, the waste lithium ion battery electrolyte solution recycling method as described in any one of the first aspect is executed.

In order to solve the problem that the waste lithium ion battery electrolyte solution cannot be completely recycled, resulting in a reduction of recycling efficiency, excessive costs of the tail gas treatment and an increased possibility of environmental pollution, the present application has the following advantages.

By cleaning the crushed battery with an organic solvent, the electrolyte in the crushed battery can be dissolved in the organic solvent. By filtering the dissolved mixture, a first solution including the electrolyte solution of the waste lithium ion battery can be obtained. By vacuum distilling the first solution and condensing the volatilized gas, the organic solvent used for cleaning and the organic components in the electrolyte solution can be recycled. The second solid is subjected to heating decomposition after the distillation, so that the second tail gas including phosphorus pentafluoride can be recycled. The remained third solid including lithium fluoride is dissolved by adding acid, and then added with soluble carbonate, or carbon dioxide, or soluble carbonate and carbon dioxide to generate lithium carbonate precipitate, thus lithium carbonate can be recycled by filtering. Therefore, the electrolyte solution in the waste lithium iron phosphate batteries is comprehensively recycled, the recycling efficiency is improved, environmental pollution is reduced, and energy conservation and emission reduction is achieved.

DETAILED DESCRIPTION OF THE DRAWINGS

DETAILED DESCRIPTION

The contents of this application will now be discussed with reference to several exemplary examples. It should be understood that these examples are discussed only to enable those skilled in the art to better understand and thus realize the contents of this application, and are not intended to imply any limitation on the scope of this application.

As used herein, the term "including" and its variants are to be interpreted as an open-ended term meaning "including but not limited to". The term "based on" is to be interpreted as "at least partially based on". The terms "an example" and "one example" are to be interpreted as "at least one example". The term "another example" is to be interpreted as "at least one other example".

The lithium ion batteries have the advantages of high voltage, small volume, high specific energy, small self-discharge and high safety, and are widely used in consumer electronic products, electric vehicles, industrial energy storage and other fields. With the rapid development of new energy vehicle industry and the rapid growth of new energy vehicle ownership in China, the decommissioning amount of lithium ion battery is increasing. According to the statistics from the solid waste and chemical management technology department of ministry of ecology and environment of China, the total number of lithium ion battery decommissioned in China is about 200,000 tons in 2020, and it is estimated that it will exceed 700,000 tons in 2025. Therefore, the waste lithium-ion battery electrolyte solution recycling has also become very important.

Figure 1:
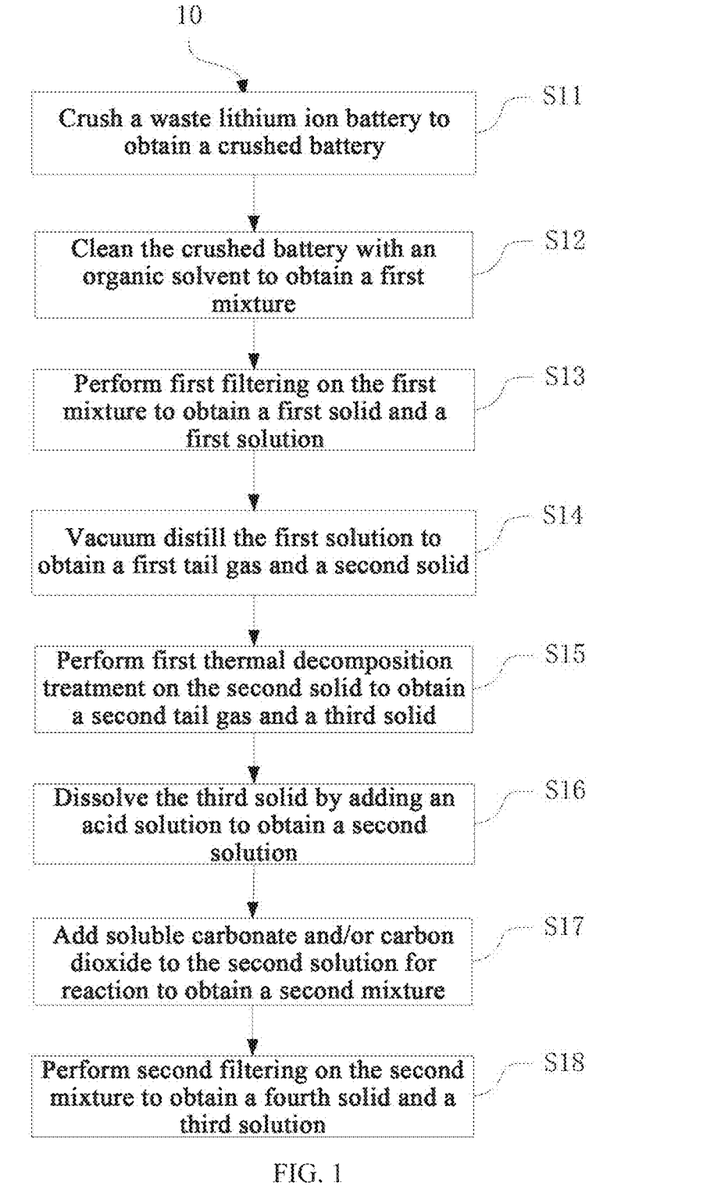
FIG. 1 shows a schematic flow diagram of some examples of waste lithium ion battery electrolyte solution recycling method.
Figure 2:
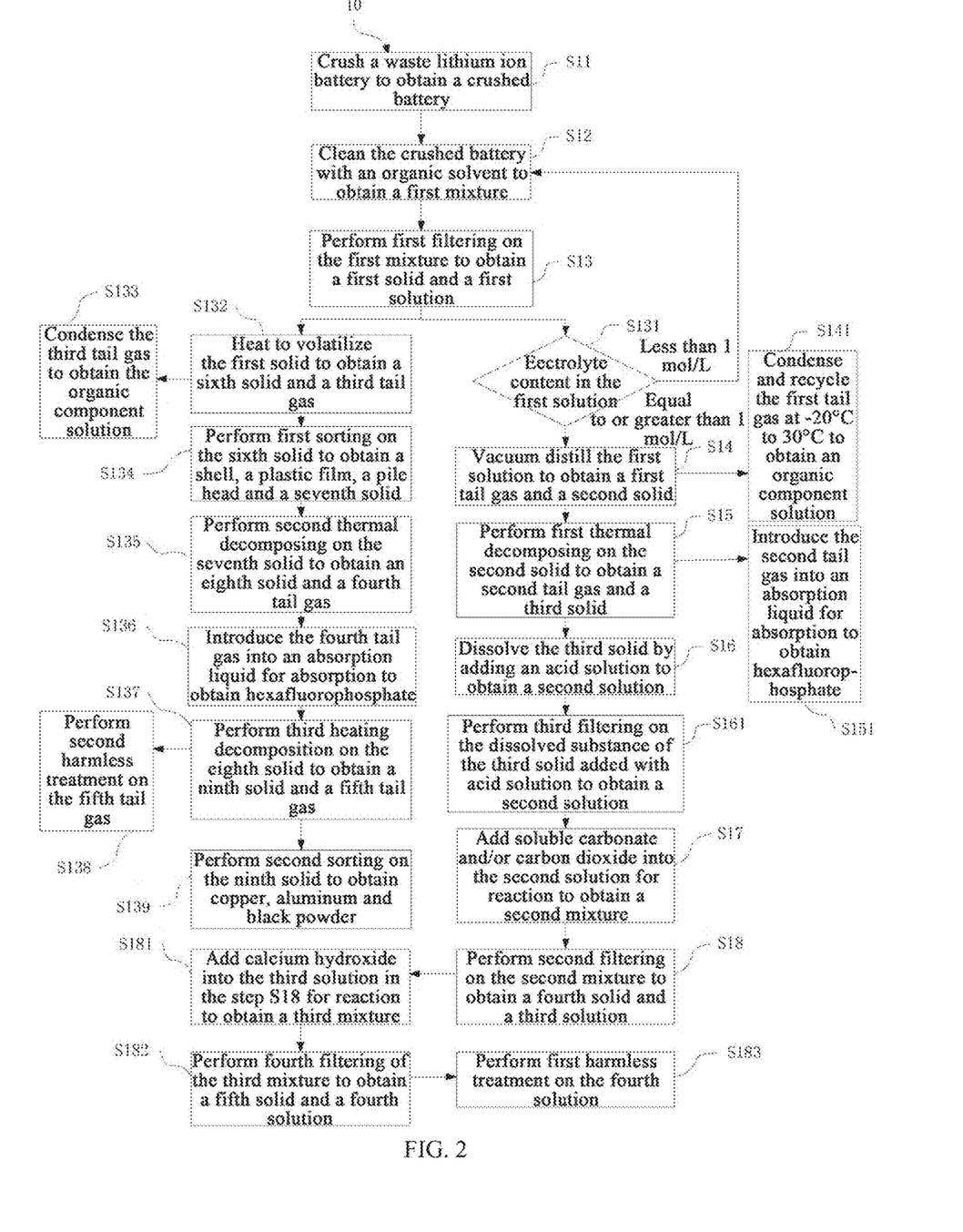
FIG. 2 shows a schematic flow diagram of some other examples of waste lithium ion battery electrolyte solution recycling method.

This embodiment discloses a waste lithium ion battery electrolyte solution recycling method 10, which is used for recycling waste lithium ion battery electrolyte solution. As shown in FIG. 1 and FIG. 2, it may include steps S11 to S15, and the above steps will be described in detail respectively.

Step S11, crushing the waste lithium ion battery to obtain a crushed battery; where the crushed battery includes the electrolyte solution of the waste lithium ion battery.

In an embodiment of the present application, the waste lithium ion battery that needs to be recycled is firstly crushed to obtain a crushed battery including the waste lithium ion battery electrolyte solution. Crushing can be carried out after discharging the waste lithium ion battery to avoid potential safety hazards, or carried out directly in inert gas environment without discharging to improve the recycle efficiency.

Step S12, cleaning the crushed battery with an organic solvent to obtain a first mixture; or performing airflow purging on the crushed battery to obtain a first mixture; or, separating the electrolyte solution from the crushed battery by centrifugation to obtain a first mixture.

In an embodiment of the present application, in the step S12, the crushed battery can be cleaned with an organic solvent, so that the electrolyte in the crushed battery can be dissolved in the organic solvent, so as to facilitate filtering and separating in subsequent steps. In some embodiments of the present application, the crushed battery can be cleaned with an organic solvent for 2 to 4 times, so that the electrolyte solution in the crushed battery can be completely separated from the crushed battery. When the content of electrolyte in the first solution used for cleaning is greater than or equal to 1 mol/L, the first solution can be filtered and separated in the next step. When the content of electrolyte in the first solution is less than 1 mol/L, the first solution can be used again for cleaning the crushed battery.

In another embodiment, the step S12 can adopt an air flow purging method, specifically, the electrolyte solution of the crushed battery can be blown out with inert gas, and then the electrolyte solution is collected to obtain the first mixture, where the inert gas is selected from the group consisting of nitrogen, helium, argon, carbon dioxide and a combination thereof.

In another embodiment, the step S12 can adopt a centrifugation method, specifically, the electrolyte solution is separated from the crushed battery by centrifugation, and then the electrolyte solution is collected to obtain the first mixture.

Step S13, performing first filtering on the first mixture to obtain a first solid and a first solution, where the first solution includes the electrolyte solution of the waste lithium ion battery.

In an embodiment of the present application, by performing the first filtering on the first mixture, the electrolyte solution can be separated from the crushed battery, so as to facilitate separating in the following steps.

Step S14, separating the first solution to obtain a first tail gas and a second solid, where the first tail gas includes a gaseous solvent of the electrolyte solution of the waste lithium ion battery, and the second solid includes an electrolyte of the electrolyte solution of the waste lithium ion battery.

In an embodiment of the present application, the separating can adopt vacuum distilling, specifically, the first solution is vacuum distilled, so that solvent of waste lithium ion battery electrolyte solution in the first solution can be changed from liquid state to gas state, and then separated from the first solution. The first tail gas including gaseous solvent of waste lithium ion battery electrolyte solution, where the gaseous solvent of waste lithium ion battery electrolyte solution change to liquid at $-20°$ C. to $30°$ C. In this way, the recycle of solvent of waste lithium ion battery electrolyte solution is completed. In some embodiments, the temperature is PC to $6°$ C., so that a large amount of gaseous electrolyte solution solvent can be condensed on the premise of saving energy. During vacuum distillation, the organic solvent used in the step S12 will also change from liquid to gas. In the environment of $-20°$ C. to $30°$ C., the gaseous organic solvent produced during vacuum distillation will change to liquid. The organic solvent can be selected from the group consisting of vinyl carbonate, propylene carbonate, dimethyl carbonate, methyl ethyl carbonate, diethyl carbonate, acetonitrile and a combination thereof. In this way, the organic solvent can dissolve the electrolyte of the waste lithium ion battery in the step S12, and can also change from liquid to gas during vacuum distillation, and finally change from gas to liquid in the environment of $-20°$ C. to $30°$ C. In other embodiments, the organic solvent can be dimethyl carbonate, so that the components of the organic component solution after condensing and recycling are all components contained in the electrolyte solution of the waste lithium ion battery. After adjusting the proportion of each component in the recycled organic component solution, the solvent for lithium ion battery electrolyte solution can be directly obtained.

In another embodiment, the separating treatment can be carried out by atmospheric distillation, specifically, the first solution is atmospheric distilled, and inert gas is introduced to take out the volatilized tail gas, and then it is condensed and recycled to obtain the first tail gas and the second solid.

In another embodiment, the separating treatment can be carried out by fractional distillation, specifically, the first solution is fractional distilled to obtain the first tail gas and the second solid. Compared with distilling, fractional distillation separates solvents with different boiling points from electrolyte solution in turn, rather than mixing and collecting them together.

Step S15, performing first heating decomposition on the second solid to obtain a second tail gas and a third solid, where the third solid includes lithium fluoride, and the second tail gas includes phosphorus pentafluoride.

In an embodiment of the present application, the electrolyte of waste lithium ion battery electrolyte solution in the second solid is decomposed at the temperature of 170° C. to 400° C. to obtain gaseous phosphorus pentafluoride and solid lithium fluoride. In this way, some valuable components in the electrolyte of waste lithium ion battery electrolyte solution can be separated from the second solid. In some embodiments, the second tail gas containing gaseous phosphorus pentafluoride is introduced into the absorption liquid, and the gaseous phosphorus pentafluoride is reacted with the absorption liquid to obtain hexafluorophosphate. The obtained hexafluorophosphate after the reaction can be used in a new production process of lithium ion battery. Thus, the purpose of recycling valuable components in the electrolyte of waste lithium ion battery electrolyte solution is achieved. The absorption liquid is a fluoride salt solution or a fluoride salt two-phase dispersion, where the fluoride salt is lithium fluoride, sodium fluoride, potassium fluoride, calcium fluoride or magnesium fluoride. In other embodiments, the absorption liquid can be potassium fluoride solution, and gaseous phosphorus pentafluoride is reacted with potassium fluoride to generate potassium hexafluorophosphate, so that hexafluorophosphate can be recycled. Because potassium fluoride can be quickly dissolved in water to form a potassium fluoride solution, gaseous phosphorus pentafluoride is introduced into the solution, and the gaseous phosphorus pentafluoride rolls in the solution, so that it can fully contact with the potassium fluoride solution, which can make the reaction rapid and improve the recycle efficiency.

Step S16, dissolving the third solid by adding an acid solution to obtain a second solution, where the second solution includes lithium ions.

In an embodiment of the present application, the third solid is added into the acid solution, and the lithium fluoride in the third solid is dissolved in the acid solution. Thus, the second solution dissolved with the acid contains lithium ions, which facilitates recycling of lithium carbonate in the next step. In some embodiments, since the third solid obtained in the previous step can also contain other components, after the step S16, the waste lithium ion battery electrolyte solution recycling method further includes a step S161, after dissolving the third solid in the acid solution, performing third filtering on the dissolved solution of the third solid added with acid solution to obtain a second solution, where the second solution includes lithium ions. Thus, the component insoluble in the acid solution can be removed through the filtrating step, and other components in the subsequent lithium carbonate precipitation are less, so that lithium carbonate with high purity can be recycled.

Step S17, adding soluble carbonate, or carbon dioxide, or soluble carbonate and carbon dioxide into the second solution for reaction to obtain a second mixture.

In the embodiment of the present application, soluble carbonate, or carbon dioxide, or soluble carbonate and carbon dioxide are added into the second solution for reaction, and lithium ions in the second solution is reacted with carbonate generated by the added soluble carbonate, or carbon dioxide, or soluble carbonate and carbon dioxide in the solution to generate lithium carbonate precipitation. In this way, high-value lithium ions in the second solution can be recycled. The soluble carbonate in the step S17 is selected from the group consisting of sodium carbonate, potassium carbonate and ammonium carbonate and a combination thereof. In other embodiments, only carbon dioxide can be used for the reaction. Carbonate can be generated by introducing carbon dioxide into the solution, and the generated carbonate reacts with lithium ions to generate lithium carbonate precipitation. In addition, since gaseous carbon dioxide will form bubbles in the solution when it is introduced into the solution, the bubbles will roll in the solution to achieve the effect of stirring the solution, which can accelerate the reaction. The cost of carbon dioxide is lower, and mechanical stirring facilities are reduced, so that the recycle cost can be reduced in the recycle process.

Step S18, performing second filtering on the second mixture to obtain a fourth solid and a third solution, where the fourth solid includes lithium carbonate.

In the embodiment of the present application, the second filtering on the second mixture is performed to obtain a fourth solid and a third solution, so that the precipitate of lithium carbonate can be separated from the second mixture. The obtained lithium carbonate can be used as a raw material for new lithium ion battery.

In some embodiments, as shown in FIG. 2, after the step S18, the waste lithium ion battery electrolyte solution recycling method can further include the following steps:

a step S181 of adding calcium hydroxide into the third solution in the step S18 for reaction to obtain a third mixture;

a step S182 of performing fourth filtering of the third mixture to obtain a fifth solid and a fourth solution, where the fifth solid includes calcium fluoride; and a step S183 of performing first harmless treatment on the fourth solution.

In this embodiment, the third solution obtained in the step S18 can be further performed the following steps to recycle its components. Step S181, adding calcium hydroxide into the third solution for reaction to obtain the precipitation of calcium fluoride. Step S182, filtering the reacted solution to recycle a fifth solid containing calcium fluoride, and the remaining being a fourth solution. Step S183, performing harmless treatment on the fourth solution, and discharging it after reaching the standard. In this way, the fluorine element in the third solution can be recycled, and finally the remained fourth solution can be volatilized to obtain solid matter, thus achieving zero pollution to the environment.

In some embodiments, as shown in FIG. 2, after the step S13, the waste lithium ion battery electrolyte solution recycling method further includes the following steps:

a step S132 of heating to volatilize the first solid in the step S13 to obtain a sixth solid and a third tail gas;

a step S133 of condensing the third tail gas to obtain the organic component solution;

a step S134 of performing first sorting on the sixth solid to obtain a shell, a plastic film, a pile head and a seventh solid;

a step S135 of performing second heating decomposition on the seventh solid to obtain an eighth solid and a fourth tail gas;

a step S136 of introducing the fourth tail gas into an absorption liquid for absorption to obtain hexafluorophosphate, where the absorption liquid is a fluoride salt solution or a fluoride salt two-phase dispersion, and the fluoride salt is lithium fluoride, sodium fluoride, potassium fluoride, calcium fluoride or magnesium fluoride;

a step S137 of performing third heating decomposition on the eighth solid to obtain a ninth solid and a fifth tail gas;

a step S138 of performing second harmless treatment on the fifth tail gas; and a step S139 of performing second sorting on the ninth solid to obtain copper, aluminum and black powder.

In this embodiment, the first solid obtained in the step S13 can be further recycled by the following steps. Step S132, heating to volatilize the first solid in the step S13 to obtain a sixth solid and a third tail gas. Step S133, condensing and recycling the third tail gas at −20° C. to 30° C. to obtain the organic component solution. Step S134, performing first sorting on the sixth solid to obtain a shell, a plastic film, a pile head and a seventh solid. Step S135, performing second heating decomposition on the seventh solid to obtain an eighth solid and a fourth tail gas. Step S136, introducing the fourth tail gas into an absorption liquid for absorption to obtain hexafluorophosphate, where the absorption liquid is a fluoride salt solution or a fluoride salt two-phase dispersion, and the fluoride salt is lithium fluoride, sodium fluoride, potassium fluoride, calcium fluoride or magnesium fluoride. In other embodiments, the absorption liquid can be potassium fluoride solution, and gaseous phosphorus pentafluoride is reacted with potassium fluoride to generate potassium hexafluorophosphate, so that hexafluorophosphate can be recycled. Because potassium fluoride can be quickly dissolved in water to form a potassium fluoride solution, gaseous phosphorus pentafluoride is introduced into the solution, and the gaseous phosphorus pentafluoride rolls in the solution, so that it can fully contact with the potassium fluoride solution, which can make the reaction rapid and improve the recycle efficiency. Step S137, performing third heating decomposition on the eighth solid to obtain a ninth solid and a fifth tail gas. Step S138, performing second harmless treatment on the fifth tail gas. Step S139, performing second sorting on the ninth solid to obtain copper, aluminum and black powder. Through the treatment of the above steps, organic component solution, shell, plastic film, pile head, hexafluorophosphate, copper, aluminum and black powder can be recycled. At the same time, the fifth tail gas is collected by a collection device and burned in a combustion device at a temperature of 1,100° C. The burnt gas enters a dust removal device for dust removal, and finally is absorbed by an adsorption device containing activated carbon and discharged into the atmosphere. In some other embodiments, the steps S132, S133, S135, S136 and S137 can also be carried out under nitrogen environment. In this way, combustion and explosion can be prevented, so the waste lithium ion battery can be safely recycled, the recycle cost can be reduced and the efficiency can be improved.

In some embodiments, the acid solution in the step S16 is selected from the group consisting of sulfuric acid, hydrochloric acid, nitric acid, hydrofluoric acid, hydrobromic acid, perchloric acid and a combination thereof.

In this embodiment, in the step S16, sulfuric acid, hydrochloric acid, nitric acid, hydrofluoric acid, hydrobromic acid, perchloric acid and a combination thereof can be added as an acid solution to dissolve the third solid. In other embodiments, a sulfuric acid solution can be used to dissolve the third solid. Sulfuric acid has stable performance and is not easy to volatilize, and the added sulfate radical does not react with the components in the third solid, which affects the recycle.

In some embodiments, the steps S11, S12, S13, S14 and S15 are all carried out in a protective atmosphere by an inert gas; the inert gas is selected from the group consisting of nitrogen, helium, argon, carbon dioxide and a combination thereof.

In this embodiment, the steps S11, S12, S13, S14 and S15 can be carried out in a protective atmosphere by an inert gas. In this way, combustion and explosion can be prevented, so the waste lithium ion battery can be safely recycled, the recycle cost can be reduced and the efficiency can be improved. In other embodiments, the inert gas can be nitrogen, which is low in cost and easily available.

The example discloses implementation steps of a waste lithium ion battery electrolyte solution recycling method:

1 t of waste lithium iron phosphate battery was put into a crushing device, and was crushed under the protection of nitrogen to obtain a crushed battery with a diameter of 10 mm. Due to the volatilization of electrolyte solution solvent and the weight loss rate of battery material of 5.6% during crushing, 944 kg of crushed battery was obtained after crushing. 1076.2 kg of organic solvent was added to the crushed battery at a solid-liquid ratio of 1:1.14, soaking and cleaning for 30 min to obtain the first mixture. The first mixture was filtered to obtain 1041.8 kg of the first solid and 956.8 kg of the first solution. The volatilizing of organic solvent in the first solution leads to a loss rate of 2% of the first solution.

The electrolyte concentration in the first solution was detected, and if the electrolyte concentration is less than 1 mol/L, the first solution will be recycled to the cleaning step. When the electrolyte concentration in the first solution is greater than or equal to 1 mol/L, the first solution will be vacuum distilled. In a nitrogen atmosphere, the first solution was heated to 80° C. and was vacuum distilled. The distilled first tail gas was taken out by nitrogen. In the condenser, the condensing temperature was controlled at 5° C., and 812.7 kg of organic components were obtained by condensing with a condensing recycle efficiency of 99%. The organic components obtained by condensing and recycling can be used for soaking and cleaning the crushed battery. The remained 135.9 kg mixture of electrolyte and impurities is the second solid. The second solid was put into the first heating decomposition device, and the temperature was raised up to 250° C. in a nitrogen atmosphere, so that lithium hexafluorophosphate in the electrolyte was decomposed into lithium fluoride and gaseous phosphorus pentafluoride. Phosphorus pentafluoride was taken out by nitrogen gas flow and absorbed by two-stage potassium fluoride solution. The concentration of potassium fluoride solution was 1.8 mol/L, and potassium hexafluorophosphate was obtained by the reaction. The third solid was obtained by the remained 23.2 kg lithium fluoride. 44.8 kg of 98% sulfuric acid was added to the third solid, the lithium fluoride was dissolved, and then filtered. The insoluble filter residue was filtered to obtain a second solution containing lithium fluoride. 47.5 kg of sodium carbonate was added to the second solution, and lithium ions were reacted with carbonate to generate lithium carbonate precipitate. After filtering, 33.1 kg of lithium carbonate solid and the third filtrate were obtained. 16.5 kg of calcium hydroxide was added to the third solution to precipitate fluoride ions, and 17.4 kg of calcium fluoride was obtained after filtering, and the fourth solution was obtained as the remaining. The fourth solution was heated to volatilize water to obtain solid sodium sulfate.

The first solid was put into a pyrolysis furnace, and volatilized at low temperature at 140° C. in nitrogen atmosphere for 90 minutes, so that the residual electrolyte solution solvent in the first solid was volatilized, which was carried out with nitrogen gas flow and then condensed and collected by a two-stage condenser to obtain 96.8 kg of organic components. The condensation temperature was controlled at 5° C., and the condensing efficiency was reached 99%. The organic components obtained by condensing and recycling can be used for soaking and cleaning the crushed battery. After low-temperature volatilized, the relatively dry crushed materials were brought into the bent pipe. Under the nitrogen atmosphere, the less dense separator, positive and negative electrode plates and electrolyte were separated by the airflow in the multi-negative pressure ventilation pipe, and 125.5 kg aluminum shell and pile head were obtained and recycled as the remaining, with a recycling rate of 99.3%. The separator, positive and negative electrode plates and electrolyte taken away by airflow were further sorted, and the separator with smaller density was separated by negative pressure airflow in inert atmosphere, the positive and negative electrode plates and electrolyte were remained, and 56.3 kg of separator was collected, with a recycling rate of 95.5%. The positive and negative electrode plates and electrolyte sorted by airflow were roasted at 250° C. for 90 minutes in nitrogen atmosphere, so that lithium hexafluorophosphate adhered to the positive and negative electrode plates was cracked to obtain lithium fluoride and phosphorus pentafluoride, and phosphorus pentafluoride was taken out by nitrogen airflow and absorbed by a two-stage potassium fluoride solution, the concentration of the potassium fluoride solution was 1.8 mol/L, and potassium hexafluorophosphate was obtained by reaction, and the positive and negative electrode plates and lithium fluoride were obtained as the remaining. The positive and negative electrode plates and lithium fluoride were calcined at 560° C. for 90 minutes in nitrogen atmosphere, so that the adhesive in the positive and negative electrode plates was carbonized, and the electrode powder and current collector could be better peeled off. The fifth tail gas generated by calcination is collected by a collection device and burned in a combustion device at the temperature of 1,100° C. The burnt gas enters a dust removal device for dust removal, and finally is absorbed by an adsorption device containing activated carbon and discharged into the atmosphere. The positive and negative electrode plates and lithium fluoride calcined at high temperature were screened to obtain 540.5 kg of positive and negative electrode black powder with a purity of 98.2%, and 133.2 kg of copper foil and aluminum foil mixture was obtained. The mixture of copper foil and aluminum foil was sorted by gravity, and 36.8 kg of aluminum foil with purity of 97.6% and 96.3 kg of copper foil with purity of 98.1% were obtained respectively.

Figure 3:
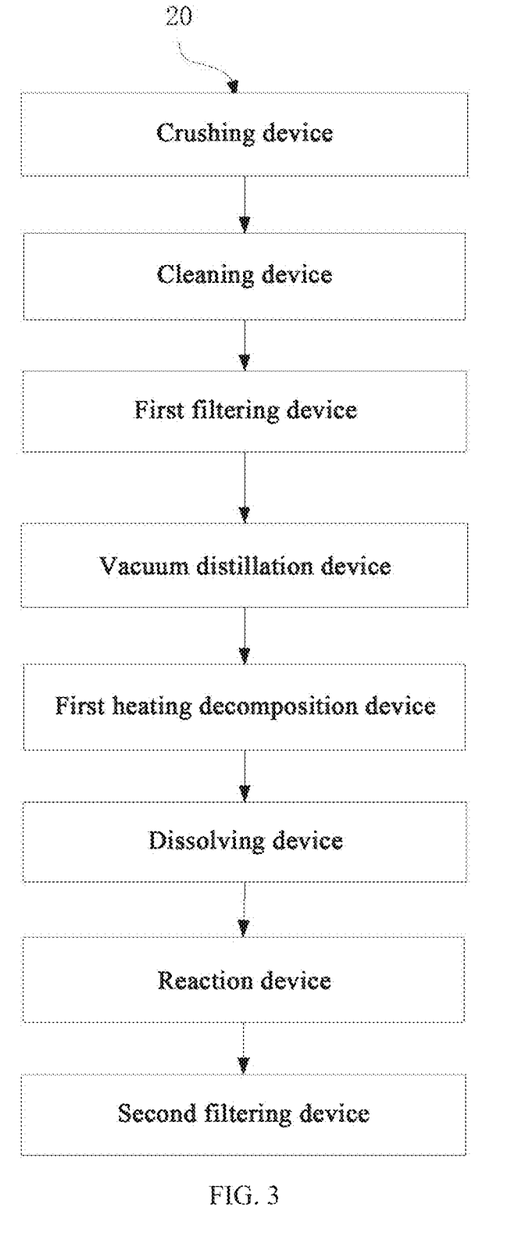
FIG. 3 shows a diagram of some examples of waste lithium ion battery electrolyte solution recycling apparatus.

Based on the same inventive concept, the present application also provides a waste lithium ion battery electrolyte solution recycling apparatus 20, which is used for recycling various components of the waste lithium ion battery, as shown in FIG. 3.

A crushing device, used for crushing the waste lithium ion battery to obtain a crushed battery; where the crushed battery includes the electrolyte solution of the waste lithium ion battery.

In the example of the present application, the crushing device is used for crushing the waste lithium-ion battery, so that the electrolyte and other substances of the waste lithium-ion battery are exposed from the shell wrapping the whole waste lithium-ion battery, so as to facilitate the recycling treatment of subsequent devices.

A cleaning device, used for cleaning the crushed battery with an organic solvent to obtain a first mixture.

In the example of the present application, the cleaning device is used for cleaning the crushed battery with an organic solvent, so that the electrolyte of the waste lithium ion battery is dissolved in the organic solvent, so as to facilitate filtering and separating by a filtering device.

A first filtering device, used for filtering the first mixture to obtain a first solid and a first solution, where the first solution includes the electrolyte solution of the waste lithium ion battery.

In the example of the present application, the first filtering device is used for filtering the first mixture, so that the electrolyte solution of the waste lithium ion battery is separated from the crushed battery, so as to facilitate the subsequent recycling of electrolyte solution in the following steps.

A vacuum distillation device, used for performing vacuum distillation on the first solution to obtain a first tail gas and a second solid, where the first tail gas includes a gaseous solvent of the electrolyte solution of the waste lithium ion battery, and the second solid includes an electrolyte of the electrolyte solution of the waste lithium ion battery.

In the example of the present application, the vacuum distillation device is used for performing vacuum distillation on the first solution, so that the electrolyte solvent in the first solution and the organic solvent added in the cleaning device can be changed from liquid state to gas state, and then separated from the first solution. In other examples, the first tail gas can also be condensed to change the mixed gas of electrolyte solvent and organic solvent into liquid for recycle.

A first heating decomposition device, used for performing first heating decomposition on the second solid to obtain a second tail gas and a third solid, where the third solid includes lithium fluoride, and the second tail gas includes phosphorus pentafluoride.

In the example of the present application, the first heating decomposition device is used for performing first heating decomposition on the second solid, so that phosphorus pentafluoride is obtained through heating decomposition, and the recycling rate of waste lithium ion battery is improved.

A dissolving device, used for dissolving the third solid by adding an acid solution to obtain a second solution, where the second solution includes lithium ions.

In the example of the present application, the dissolving device is used for dissolving the third solid with an acid solution, so that the second solution dissolved with the acid contains lithium ions, which facilitates generating and recycling of lithium carbonate in the next step.

A reaction device, used for adding soluble carbonate, or carbon dioxide, or soluble carbonate and carbon dioxide into the second solution for reaction to obtain a second mixture.

In the example of the present application, the reaction device is used for adding soluble carbonate, or carbon dioxide, or soluble carbonate and carbon dioxide into the second solution for reaction, and lithium ions in the second solution is reacted with carbonate generated by the added soluble carbonate, or carbon dioxide, or soluble carbonate and carbon dioxide in the solution to generate lithium carbonate precipitation. In this way, high-value lithium ions in the second solution can be recycled.

A second filtering device, used for filtering the second mixture to obtain a fourth solid and a third solution, where the fourth solid includes lithium carbonate.

In the example of the present application, the second filtering device is used for filtering the second mixture to obtain a fourth solid and a third solution. In this way, the precipitate of lithium carbonate can be separated from the precipitate. The obtained lithium carbonate can be used as a raw material for new lithium ion battery.

Figure 4:
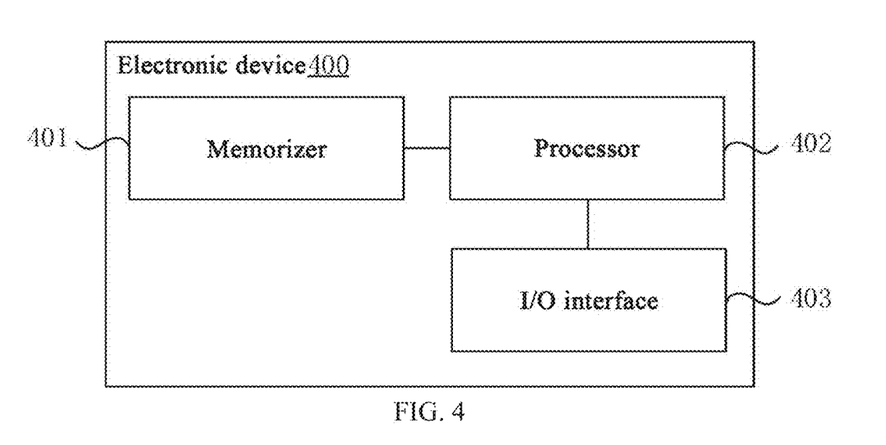
FIG. 4 shows a schematic diagram of an electronic device.

As shown in FIG. 4, an embodiment of the present application provides an electronic device 400. The electronic device 400 includes a memorizer 401, a processor 402, and an Input/Output (I/O) interface 403. The memorizer 401 is used for storing an instruction. The processor 402 is used for calling the instruction stored in the memorizer 401 to execute the waste lithium ion battery electrolyte solution recycling method according to the example of the present application. The processor 402 is connected to the memorizer 401 and the I/O interface 403, respectively. For example, through a bus system and/or other connection mechanisms (not shown). The memorizer 401 can be used to store programs and data, including the program of the waste lithium ion battery electrolyte solution recycling method in the example of the present application. The processor 402 executes various functional applications and data processing of the electronic device 400 by running the programs stored in the memorizer 401.

The processor 402 in the example of the present application can be realized in at least one hardware form of a Digital Signal Processing (DSP), a Field-Programmable Gate Array (FPGA), a Programmable Logic Array (PLA). The processor 402 can be one of Central Processing Units (CPU) or other processing units with data processing capability and/or instruction execution capability, or a combination thereof.

The memorizer 401 in the example of the present application may include one or more computer program products, which may include various forms of computer readable storage media, such as volatile memorizer and/or nonvolatile memorizer. The volatile memorizer may include, for example, a Random Access Memory (RAM) and/or a cache. The nonvolatile memorizer may include, for example, a Read-Only Memory (ROM), a Flash Memory, a Hard Disk Drive (HDD) or a Solid-State Drive (SSD).

In the example of the present application, the I/O interface 403 can be used to receive an input instruction (such as digital or character information, and generate key signal input related to user setting and function control of the electronic device 400, etc.), and can also output various information (such as images or sounds, etc.) to the outside. The I/O interface 403 in the example of the present application may include one or more of a physical keyboard, function buttons (such as volume control buttons, switch buttons, etc.), a mouse, a joystick, a trackball, a microphone, a speaker, a touch panel, etc.

It can be understood that although the operations in the example of the present application are described in a specific order in the drawings, it should not be understood as requiring that these operations be performed in the specific order or serial order shown, or that all the operations shown should be performed to obtain the desired results. In certain circumstances, multitasking and parallel processing may be beneficial.

The method and apparatus involved in the example of the present application can be completed by using standard programming technology, and various method steps can be realized by using rule-based logic or other logic. It should also be noted that the terms "means" and "module" used here and in the claims are intended to include implementations using one or more lines of software code and/or hardware implementations and/or devices for receiving input.

Any steps, operations, or programs described herein may be performed or implemented using one or more hardware or software modules alone or in combination with other devices. In one implementation, a software module is implemented using a computer program product including a computer-readable medium containing computer program code, which can be executed by a computer processor for performing any or all of the described steps, operations or programs.

The foregoing description of the implementation of the present application has been given for purposes of illustration and description. The foregoing description is not exhaustive or intended to limit the present application to the precise form disclosed, and various variations and modifications are possible in light of the above teachings, or may be obtained from the practice of the present application. These examples were chosen and described in order to explain the principles of the present application and its practical application, so as to enable those skilled in the art to utilize the present application in various implementations and with various modifications as are suited to the particular use contemplated.

The invention claimed is:

1. A waste lithium ion battery electrolyte solution recycling method, wherein the waste lithium ion battery electrolyte solution recycling method comprises the following steps:
    a step S12 of cleaning a crushed battery with an organic solvent to obtain a first mixture; or performing airflow purging on the crushed battery to obtain a first mixture; or separating an electrolyte solution from the crushed battery by centrifugation to obtain a first mixture;
    a step S13 of performing first filtering on the first mixture to obtain a first solid and a first solution, wherein the first solution comprises the electrolyte solution of the waste lithium ion battery;
    a step S14 of separating the first solution to obtain a first tail gas and a second solid, wherein the first tail gas comprises a gaseous solvent of the electrolyte solution of the waste lithium ion battery, and the second solid comprises an electrolyte of the electrolyte solution of the waste lithium ion battery;
    a step S15 of performing first heating decomposition on the second solid to obtain a second tail gas and a third solid, wherein the third solid comprises lithium fluoride, and the second tail gas comprises phosphorus pentafluoride;
    a step S16 of dissolving the third solid by adding an acid solution to obtain a second solution, wherein the second solution comprises lithium ions;
    a step S17 of adding soluble carbonate, or carbon dioxide, or soluble carbonate and carbon dioxide into the second solution for reaction to obtain a second mixture; and
    a step S18 of performing second filtering on the second mixture to obtain a fourth solid and a third solution, wherein the fourth solid comprises lithium carbonate.

2. The waste lithium ion battery electrolyte solution recycling method according to claim 1, wherein before the step S12, the waste lithium ion battery electrolyte solution recycling method further comprises a step S11 of crushing a waste lithium ion battery to obtain the crushed battery; wherein the crushed battery comprises the electrolyte solution of the waste lithium ion battery.

3. The waste lithium ion battery electrolyte solution recycling method according to claim 2, wherein in the step S14, the separating is selected from vacuum distillation, atmospheric distillation and fractional distillation.

4. The waste lithium ion battery electrolyte solution recycling method according to claim 3, wherein after the step S13, the waste lithium ion battery electrolyte solution recycling method further comprises a step S131 of detecting a content of electrolyte in the first solution in the step S13; when the content of electrolyte content is less than 1 mol/L, the first solution is used as the organic solvent in the step S12 to clean the crushed battery; when the content of electrolyte is equal to or greater than 1 mol/L, the step S14 is executed.

5. The waste lithium ion battery electrolyte solution recycling method according to claim 3, wherein after the step S14, the waste lithium ion battery electrolyte solution recycling method further comprises a step S141 of condensing and recycling the first tail gas in the step S14 at −20° C. to 30° C. to obtain an organic component solution.

6. The waste lithium ion battery electrolyte solution recycling method according to claim 5, wherein after the step S13, the waste lithium ion battery electrolyte solution recycling method further comprises the following steps:
- a step S132 of heating to volatilize the first solid in the step S13 to obtain a sixth solid and a third tail gas;
- a step S133 of condensing the third tail gas to obtain the organic component solution;
- a step S134 of performing first sorting on the sixth solid to obtain a shell, a plastic film, a pile head and a seventh solid;
- a step S135 of performing second heating decomposition on the seventh solid to obtain an eighth solid and a fourth tail gas;
- a step S136 of introducing the fourth tail gas into an absorption liquid for absorption to obtain hexafluorophosphate, wherein the absorption liquid is a fluoride salt solution or a fluoride salt two-phase dispersion, and the fluoride salt is lithium fluoride, sodium fluoride, potassium fluoride, calcium fluoride or magnesium fluoride;
- a step S137 of performing third heating decomposition on the eighth solid to obtain a ninth solid and a fifth tail gas;
- a step S138 of performing second harmless treatment on the fifth tail gas; and
- a step S139 of performing second sorting on the ninth solid to obtain copper, aluminum and black powder.

7. The waste lithium ion battery electrolyte solution recycling method according to claim 3, wherein after the step S15, the waste lithium ion battery electrolyte solution recycling method further comprises a step S151 of introducing the second tail gas in the step S15 into an absorption liquid for absorption to obtain hexafluorophosphate, wherein the absorption liquid is a fluoride salt solution or a fluoride salt two-phase dispersion, and the fluoride salt is lithium fluoride, sodium fluoride, potassium fluoride, calcium fluoride, or magnesium fluoride.

8. The waste lithium ion battery electrolyte solution recycling method according to claim 3, wherein after the step S16, the waste lithium ion battery electrolyte solution recycling method further comprises a step S161 of performing third filtering on a dissolved substance of the third solid added with the acid solution in the step S16 to obtain the second solution, wherein the second solution comprises lithium ions.

9. The waste lithium ion battery electrolyte solution recycling method according to claim 3, wherein after the step S18, the waste lithium ion battery electrolyte solution recycling method further comprises the following steps:
- a step S181 of adding calcium hydroxide into the third solution in the step S18 for reaction to obtain a third mixture;
- a step S182 of performing fourth filtering on the third mixture to obtain a fifth solid and a fourth solution, wherein the fifth solid comprises calcium fluoride; and
- a step S183 of performing first harmless treatment on the fourth solution.

10. The waste lithium ion battery electrolyte solution recycling method according to claim 3, wherein the organic solvent in the step S12 is selected from the group consisting of vinyl carbonate, propylene carbonate, dimethyl carbonate, methyl ethyl carbonate, diethyl carbonate, acetonitrile and a combination thereof.

11. The waste lithium ion battery electrolyte solution recycling method according to claim 3, wherein the acid solution in the step S16 is selected from the group consisting of sulfuric acid, hydrochloric acid, nitric acid, hydrofluoric acid, hydrobromic acid, perchloric acid and a combination thereof.

12. The waste lithium ion battery electrolyte solution recycling method according to claim 3, wherein the soluble carbonate in the step S17 is selected from the group consisting of sodium carbonate, potassium carbonate, ammonium carbonate and a combination thereof.

13. The waste lithium ion battery electrolyte solution recycling method according to claim 2, wherein the steps S11, S12, S13, S14 and S15 are all carried out in a protective atmosphere by an inert gas, wherein the inert gas is selected from the group consisting of nitrogen, helium, argon, carbon dioxide and a combination thereof.

14. A waste lithium ion battery electrolyte solution recycling apparatus, wherein the waste lithium ion battery electrolyte solution recycling apparatus comprises the following devices:
- a crushing device, used for crushing a waste lithium-ion battery to obtain a crushed battery; wherein the crushed battery comprises an electrolyte solution of the waste lithium ion battery;
- a cleaning device, used for cleaning the crushed battery with an organic solvent to obtain a first mixture;
- a first filtering device, used for filtering the first mixture to obtain a first solid and a first solution, wherein the first solution comprises the electrolyte solution of the waste lithium ion battery;
- a vacuum distillation device, used for performing vacuum distillation on the first solution to obtain a first tail gas and a second solid, wherein the first tail gas comprises a gaseous solvent of the electrolyte solution of the waste lithium ion battery, and the second solid comprises an electrolyte of the electrolyte solution of the waste lithium ion battery;
- a first heating decomposition device, used for performing first heating decomposition on the second solid to obtain a second tail gas and a third solid, wherein the third solid comprises lithium fluoride, and the second tail gas comprises phosphorus pentafluoride;
- a dissolving device, used for dissolving the third solid by adding an acid solution to obtain a second solution, wherein the second solution comprises lithium ions;
- a reaction device, used for adding soluble carbonate, or carbon dioxide, or soluble carbonate and carbon dioxide into the second solution for reaction to obtain a second mixture; and
- a second filtering device, used for filtering the second mixture to obtain a fourth solid and a third solution, wherein the fourth solid comprises lithium carbonate.

15. An electronic device, wherein the electronic device comprises: a memorizer, used for storing an instruction; and a processor, used for calling the instruction stored in the memorizer to execute the waste lithium ion battery electrolyte solution recycling method according to claim 1.

16. A computer readable storage medium, wherein the computer readable storage medium stores an instruction, and when the instruction is executed by a processor, the waste lithium ion battery electrolyte solution recycling method according to claim 1 is executed.

* * * * *